US012566800B2

(12) United States Patent
Sambavarvadakarai Rajagopalan et al.

(10) Patent No.: US 12,566,800 B2
(45) Date of Patent: Mar. 3, 2026

(54) EFFICIENT AND SCALABLE DATA PROCESSING AND MODELING

(71) Applicant: Google LLC, Mountain View, CA (US)

(72) Inventors: Rajesh Sambavarvadakarai Rajagopalan, Campbell, CA (US); Mrinalini Sharma, Campbell, CA (US); Anthony Joseph Rice, Denver, CO (US); Taimur Mushtaq Khan, Redmond, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/916,173

(22) Filed: Oct. 15, 2024

(65) Prior Publication Data

US 2025/0284741 A1      Sep. 11, 2025

Related U.S. Application Data

(60) Provisional application No. 63/562,979, filed on Mar. 8, 2024.

(51) Int. Cl.
*G06F 7/00* (2006.01)
*G06F 16/9032* (2019.01)

(52) U.S. Cl.
CPC .............................. *G06F 16/9032* (2019.01)

(58) Field of Classification Search
CPC ................................................ G96F 16/9032
See application file for complete search history.

(56) References Cited

U.S. PATENT DOCUMENTS

| | | | |
|---|---|---|---|
| 8,229,789 B2 * | 7/2012 | Riedl ................. | H04N 21/2668 |
| | | | 705/14.72 |
| 8,996,402 B2 * | 3/2015 | Priyadarshan ..... | G06Q 30/0249 |
| | | | 705/14.42 |
| 10,917,310 B2 | 2/2021 | So et al. | |
| 2007/0130009 A1 * | 6/2007 | Steelberg ............... | H04H 60/33 |
| | | | 705/14.46 |

(Continued)

OTHER PUBLICATIONS

Wikipedia.org [online], "String interning" created on Jan. 2005, retrieved on Feb. 26, 2025, retrieved from URL <https://en.wikipedia.org/wiki/String_interning>, 3 pages.

*Primary Examiner* — Mohammed R Uddin
(74) *Attorney, Agent, or Firm* — Fish & Richardson P.C.

(57) ABSTRACT

Methods, systems, and apparatus, including computer programs encoded on a computer storage medium, for improved forecasting of the distribution of digital components that may be provided over a network as a response to an electronic request for certain types of content. In some aspects, a method includes receiving a request comprising distribution parameters for a given digital campaign. Futurized queries are obtained from historical serving logs of a serving system that is configured to provide existing digital components using serving code. Each digital campaign of multiple digital campaigns is assigned to one of multiple matching computers. Each assigned matching computer identifies one or more of the futurized queries that match the digital campaign assigned to the matching computer. Matching data indicating the one or more futurized queries can be stored in a file system. A queue entry for each instance of matching data is added to a queue.

20 Claims, 6 Drawing Sheets

(56)                    References Cited

U.S. PATENT DOCUMENTS

| | | | |
|---|---|---|---|
| 2010/0268600 A1* | 10/2010 | Banko | G06Q 30/0254 |
| | | | 705/14.52 |
| 2012/0004957 A1* | 1/2012 | Chen | G06Q 30/0241 |
| | | | 705/14.4 |
| 2013/0066709 A1* | 3/2013 | Riley | G06Q 30/0254 |
| | | | 705/14.42 |
| 2020/0313976 A1* | 10/2020 | So | H04L 41/145 |

* cited by examiner

EFFICIENT AND SCALABLE DATA PROCESSING AND MODELING

CROSS REFERENCE TO RELATED APPLICATION

This application claims the benefit under 35 U.S.C. § 119 (e) of U.S. Patent Application No. 63/562,979, filed on Mar. 8, 2024, which is incorporated herein by reference in its entirety for all purposes.

TECHNICAL FIELD

This specification generally relates to data processing, modeling, and system architectures and techniques that increase the efficiency and scalability of data processing and modeling.

BACKGROUND

The Internet facilitates the exchange of information between users across the globe. This exchange of information enables distribution of content to a variety of users. In some situations, content from multiple different providers can be integrated into a single electronic document to create a composite document. For example, a portion of the content included in the electronic document may be selected (or specified) by a publisher of the electronic document. A different portion of content (e.g., digital component) can be provided by a third-party (e.g., an entity that is not a publisher of the electronic document and/or does not have access to modify code defining the electronic document).

In some situations, however, the digital component is selected for integration with the electronic document only after presentation of the electronic document has been requested and/or while the electronic document is being rendered. For example, machine executable instructions included in the electronic document can be executed by a client device when the electronic document is rendered at the client device. The executable instructions can enable the client device to contact one or more remote servers to obtain a digital component that will be integrated into the electronic document while presented at the client device. Given the dynamic and global nature of the Internet, it is difficult to model and forecast the way in which digital components will be provided to users over time.

SUMMARY

This document describes systems and techniques for improved forecasting of the distribution of digital components that may be provided over a network as a response to an electronic request for certain types of content. The systems and techniques include enhanced data storage, data processing, and/or queuing that provide faster and more efficient forecasting that can easily scale to handle any number of forecasting requests.

The electronic request can be received from a user/client device that interacts with content of a publisher page that is displayed or rendered on the client device. In some cases, the request can be received from a publisher server that hosts the publisher page. A content provider may submit specialized content (e.g., digital components) to a content platform as a candidate for use in responding to the request. The content platform can be configured to manage use and selection of specialized content as responses to requests for such content.

Based on the described techniques, a forecasting system of the content platform can forecast distribution of digital components and generate an output that indicates a quantity of users to which the digital components will be directed by a distribution system of the content platform. For example, the forecasting system can forecast performance by using computing logic of a retrieval library that is a substantial or exact match to computing logic executed in the serving system of the content platform. The forecasting system can hold a futurized set of user queries in memory and process information in the queries against distribution parameters of an incoming request from a content provider to distribute one or more digital components. The forecasting system can determine information in a set of futurized user queries that is similar to, or matches, the parameters of the incoming requests from content providers. The forecasting system generates the output using the information for these similar or matching futurized queries. For example, the forecasting system can allocate futurized queries to digital components of content providers for which the queries match the parameters of the content providers' requests.

The described techniques include configuring program code ("serving code") executed at the serving system such that the serving code can be efficiently re-used and implemented at the forecasting system to perform accurate impression forecasting. For example, the serving code is uniquely organized to enable the overall computing logic of the serving code to be maintained as a retrieval library so that the serving representation of a digital campaign and corresponding retrieval library is easily reversible for effective implementation at the forecasting system. Requests from a content provider to distribute one or more digital components may be referred to herein as a digital campaign. A digital campaign can include one or more digital components and one or more parameters (e.g., distribution parameters and filtering requirements).

Using these techniques, the serving code can be organized or structured to have fewer, e.g., substantially fewer, global structures, relative to other methods. The serving code also does not require reverse-indexes that are built over existing digital campaigns, which can preclude effective re-use and implementation of the code by the forecasting system. Also, a per-campaign data structure is configured to be the same between the serving and forecasting systems. This allows campaign data structures to be easily reused at the forecasting system to construct a per forecast-request campaign representation, thereby reducing developer burden and enabling the forecasting system to benefit from developments and improvements that are made to the serving system.

Operations performed by the forecasting system can be decoupled such that operations for matching campaigns of requests to futurized queries can be performed by different computers, processors, or other data processing apparatus, than the operations for allocating futurized queries to campaigns. Additionally, the matching operations can be split, e.g., sharded, between multiple data processing apparatus. This increases the speed and efficiency at which the matching processes are performed and improves the scalability of each process such that the forecasting system can respond to more requests and/or respond at a faster rate. The allocated futurized queries can be mapped to campaigns using a bipartite graph in which each futurized query is represented by a node, each campaign is represented by a node, and the node for each futurized query (e.g., each instance of a futurized query) is connected to one campaign by an edge.

The forecasting system can respond to requests from many different content providers resulting in frequent changes to campaigns and therefore changes to the matching and/or allocations between futurized queries and campaigns. To support such fast and dynamic changes in campaigns, a high performance queue system can be used to propagate the matching data from the matching computers to the allocation computer(s). The queue system can include a file system that stores matching data for campaigns and a queue that stores pointers to locations within the file system where the matching data for each campaign is stored. As described in more detail below, this enables the queue system to support random access of matching data and persistence while skipping old matching data for campaigns, which increases throughput, forecasting speed and efficiency, and faster recovery from errors, e.g., the allocation computer(s) crashing or otherwise becoming inoperable.

In some implementations, the queue entries are decoupled into a file system and a metadata entry in a database, which allows multiple writers to prepare entries before adding the entries to the queue system. In this way, both new and existing campaign processing threads in the matching computers can prepare in parallel, but may not be able to commit the entries to the same queue as order does not matter for the consumer, e.g., the allocation computer(s). Similarly, the allocation computers can consume in order by having parallel processing threads, e.g., new versus existing updates, to process the queue entries as queue entries with metadata is decoupled from reading the data from the file system. This provides another advantage in addition to crash recovery. Having a single queue of queue entries can block processing the important data later in case of limited resources like memory of the allocation computer(s). This decoupling effectively allows the allocation computer to peek into the data in the queue and determine the processing priority based on metadata without actually reading the data, which could otherwise exhaust resources and block processing important queue entries added later.

In some implementations, the forecasting system can process requests for new campaigns in a different order than existing campaigns. For example, the forecasting system can prioritize new campaigns and process their requests prior to processing requests for existing campaigns as changes to existing campaigns may not affect the allocation of futurized queries to campaigns as much as new campaigns. This decoupling and prioritization of different types of updates can prevent accepting conflicting allocations across the entire stack.

In general, one innovative aspect of the subject matter described in this specification can be embodied in methods that include the actions of receiving a request including distribution parameters for a given digital campaign; obtaining, based on the received request, futurized queries from historical serving logs of a serving system that is configured to provide existing digital components using serving code; for each of multiple digital campaigns including the given digital campaign: assigning the digital campaign to one of multiple matching computers; identifying, by the assigned matching computer, one or more of the futurized queries that match the digital campaign; storing matching data indicating the one or more futurized queries in a file of a file system; adding a queue entry for the matching data to a queue; and updating metadata for the digital campaign in a data structure, wherein the metadata includes an identifier for the digital campaign and memory location information indicating a location in the file at which the matching data is stored; generating an allocation of futurized queries to digital campaigns by processing the matching data for each digital campaign to allocate at least one futurized query to each digital campaign; and generating, for the given digital campaign and based on the allocation of the futurized queries to the digital campaigns, a forecast output as a response to the request, wherein the forecast output includes data describing future provision of one or more digital components of the given digital campaign. Other implementations of this aspect include corresponding apparatus, systems, and computer programs, configured to perform the aspects of the methods, encoded on computer storage devices.

These and other embodiments can each optionally include one or more of the following features. In some aspects, a single allocation computer generates the allocation of the futurized queries to the digital campaigns.

In some aspects, identifying, by the assigned matching computer, one or more of the futurized queries to the digital campaign includes determining, for each futurized query, a measure of similarity between the distribution parameters and the futurized query; and selecting the one or more futurized queries for the digital campaign based on each measure of similarity.

In some aspects, the forecast output indicates a quantity of users to which the one or more digital components will be directed by the serving system.

In some aspects, the file system includes a plurality of files and at least some of the files store matching data for multiple campaigns.

In some aspects, each queue entry points to a location in the file system at which the matching data corresponding to the queue entry is stored.

In some aspects, the metadata for each digital campaign includes data indicating whether the digital campaign is a new campaign or an existing campaign.

In some aspects, generating the allocation of futurized queries to digital campaigns by processing the matching data for each digital campaign to allocate at least one futurized query to each digital campaign includes processing the matching data for digital campaigns for which the metadata indicates that the digital campaigns are new prior to processing the matching data for digital campaigns for which the metadata indicates that the digital campaigns are existing.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In general, this document describes systems and techniques for improved forecasting of the distribution of digital components that can be provided over a network as a response to an electronic request for certain types of content. The systems and techniques include enhanced data storage, data processing, and/or queuing that provide faster and more efficient forecasting that can easily scale to handle any number of forecasting requests.

Figure 1:
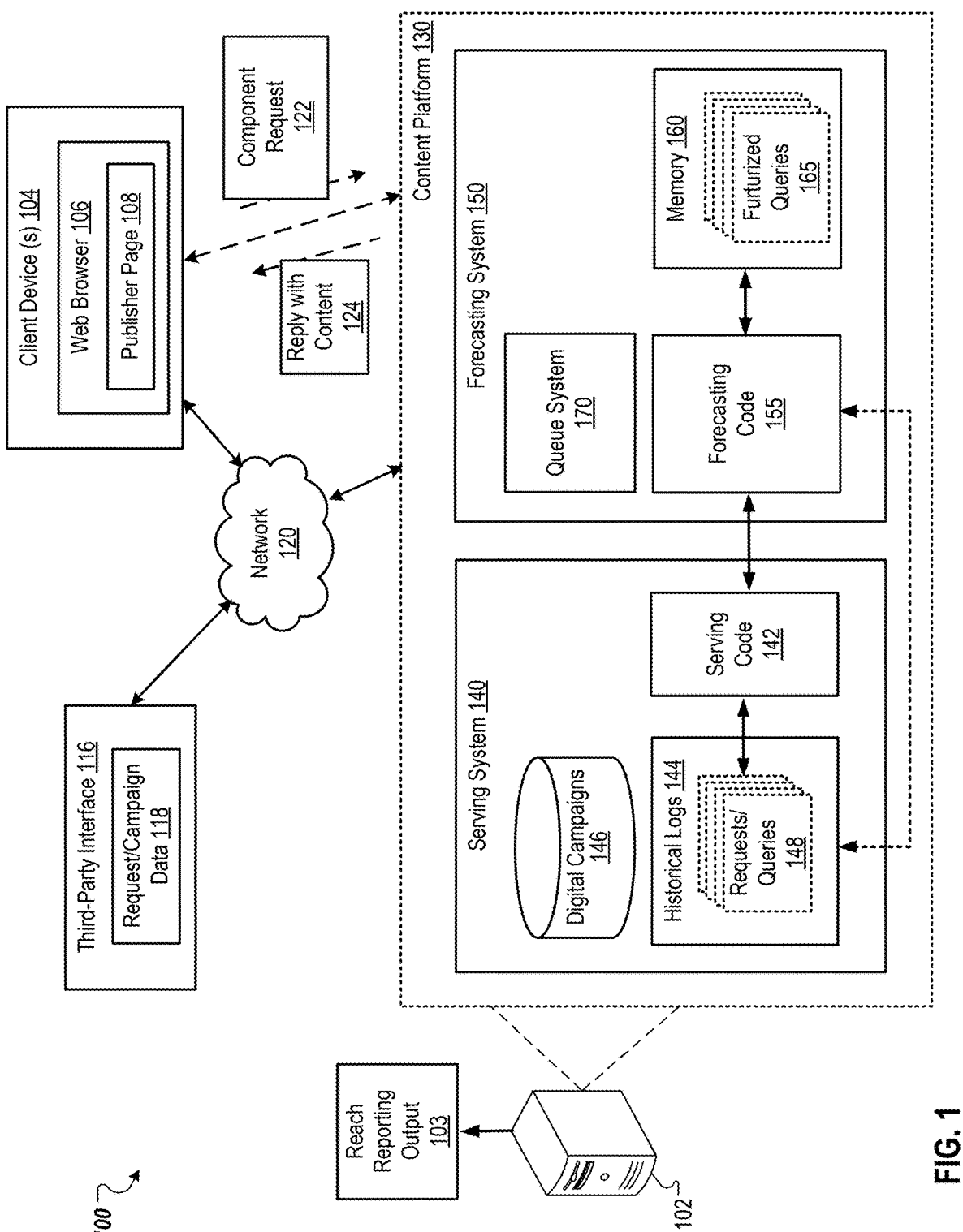
FIG. 1 shows an example computing system for forecasting performance of a digital campaign.

FIG. 1 shows an example computing system 100 for forecasting performance of a digital campaign. The system 100 generally includes one or more computers 102, which can be implemented as server class computers, a client device 104, a third-party interface 116, a network 120, and a content platform 130. As described in more detail below, a forecasting system 150 of the content platform 130 can be implemented using multiple data processing apparatus, e.g., multiple servers or other types of computers. Similarly, a serving system 140 of the content platform can be implemented using multiple data processing apparatus.

In some implementations, system 100 and server 102 can include one or more processors, memory, and data storage devices, e.g., non-transitory storage devices, that collectively form the system 100. The processors of the system 100 and server 102 process instructions for execution by devices and components of the system, including instructions stored in the memory or on storage devices for performing operations/actions described in this document.

For example, execution of the stored instructions can cause performance of operations that are described in more detail below. In other implementations, multiple processors may be used, as appropriate, along with multiple memories and types of memory. For example, devices and components of both system 100 and server 102 may be connected with multiple other computing devices, with each device (e.g., a server bank, groups of servers, or a multi-processor system) performing portions of the actions or operations associated with the processes or logical flows described in this specification.

In general, server 102 and other components of system 100 can be implemented, in part, by execution of program code in the form of an executable application, otherwise known as an "app," that can be launched or executed using a client or user device. Upon execution, the app can establish a data connection with server(s) of system 100 to transmit data signals to the server as well as receives data signals from the server.

A client device 104 is an electronic device capable of requesting and receiving online resources over the network 120. Example client devices 104 include personal computers, gaming devices, mobile communication devices, digital assistant devices, augmented reality devices, virtual reality devices, and other devices that can send and receive data over the network 120. A client device 104 typically includes a user application, such as a web browser, to facilitate the sending and receiving of data over the network 120, but native applications (other than browsers) executed by the client device 104 can also facilitate the sending and receiving of data over the network 120.

A gaming device is a device that enables a user to engage in gaming applications, for example, in which the user has control over one or more characters, avatars, or other rendered content presented in the gaming application. A gaming device typically includes a computer processor, a memory device, and a controller interface (either physical or visually rendered) that enables user control over content rendered by the gaming application. The gaming device can store and execute the gaming application locally, or execute a gaming application that is at least partly stored and/or served by a cloud server (e.g., online gaming applications). Similarly, the gaming device can interface with a gaming server that executes the gaming application and "streams" the gaming application to the gaming device. The gaming device may be a tablet device, mobile telecommunications device, a computer, or another device that performs other functions beyond executing the gaming application.

Digital assistant devices include devices that include a microphone and a speaker. Digital assistant devices are generally capable of receiving input by way of voice, and respond with content using audible feedback, and can present other audible information. In some situations, digital assistant devices also include a visual display or are in communication with a visual display (e.g., by way of a wireless or wired connection). Feedback or other information can also be provided visually when a visual display is present. In some situations, digital assistant devices can also control other devices, such as lights, locks, cameras, climate control devices, alarm systems, and other devices that are registered with the digital assistant device.

The network 120 can be a local area network (LAN), a wide area network (WAN), the Internet, a mobile network, or any combination thereof. The network 120 connects client devices 104, third-party interface 116, and content platform 130 of server 102. The system 100 can include many different user/client devices 104 that can receive a variety of electronic documents that include different types of digital components (described below) transmitted by a content server of content platform 130.

An electronic document can be data that presents a set of content at a client device 104. For example, publisher page 108 can be an electronic document that is configured to receive and/or integrate one or more digital components for display at the client device 104. Examples of other electronic documents include webpages, word processing documents, portable document format (PDF) documents, images, videos, search results pages, and feed sources. A client device can include a web browser 106 or other application that is configured to request and present electronic documents. Native applications (e.g., "apps"), such as applications installed on mobile, tablet, or desktop computing devices are also examples of electronic documents.

A publisher of a given electronic document can maintain a data source that is used to populate portions of the electronic document. An electronic document can include a tag or script that causes the client device 104 to request content from the data source when the given electronic document is processed (e.g., rendered or executed) by a client device 104. The client device 104 integrates the content obtained from the data source into the given electronic document to create a composite electronic document including the content obtained from the data source.

An electronic document can include a tag or script for obtaining a digital component. In these situations, the tag or script is executed by the client device 104 when the given electronic document is processed by the client device 104. Execution of a script causes the client device 104 to generate a request for digital components (referred to as a "component request 122"), which is transmitted over the network 120 to content platform 130. The content platform 130 can use information in the request 122 to select one or more digital components that are provided in response (e.g., as a "reply 124") to the request for content 122.

As used throughout this document, the phrase "digital component" refers to a discrete unit of digital content or digital information (e.g., a video clip, audio clip, multimedia clip, gaming content, image, text, bullet point, artificial intelligence output, language model output, or another unit of content). A digital component can electronically be stored in a physical memory device as a single file or in a collection of files, and digital components can take the form of video files, audio files, multimedia files, image files, or text files and include advertising information, such that an advertisement is a type of digital component.

The component request 122 can include event data specifying features such as a name (or network location) of a server from which the digital component is being requested, a name (or network location) of the requesting device (e.g., the client device 104), and/or information that the content platform 130 can use to select one or more digital components, or other content, provided in response to the request. The component request 122 is transmitted, by the client device 104, over the network 120 to a server of the content platform 130.

The component request 122 can include event data specifying other event features, such as the electronic document being requested and characteristics of locations of the electronic document at which digital component can be presented. For example, event data specifying a reference (e.g., URL) to an electronic document (e.g., webpage) in which the digital component will be presented, available locations of the electronic documents that are available to present digital components, sizes of the available locations, and/or media types that are eligible for presentation in the locations can be provided to the service apparatus 110. Similarly, event data specifying keywords associated with the electronic document ("document keywords") or entities (e.g., people, places, or things) that are referenced by the electronic document can also be included in the component request 122 (e.g., as payload data) and provided to the content platform 130 to facilitate identification of digital components that are eligible for presentation with the electronic document. The event data can also include a search query that was submitted from the client device 104 to obtain a search results page.

Component requests 122 can also include event data related to other information, such as information that a user of the client device has provided, geographic information indicating a state or region from which the component request was submitted, or other information that provides context for the environment in which the digital component will be displayed (e.g., a time of day of the component request, a day of the week of the component request, a type of device at which the digital component will be displayed, such as a mobile device or tablet device). Component requests 122 can be transmitted, for example, over a packetized network, and the component requests 122 themselves can be formatted as packetized data having a header and payload data. The header can specify a destination of the packet and the payload data can include any of the information discussed above.

Third-party interface 116 can be an example user/mobile computing device, client computer, or any combination of software, middleware, or related front-end components. Interface 116 is configured to exchange data communications with content platform 130. For example, the interface 116 can provide a campaign request 118 that includes details about a digital campaign that directs specialized content, e.g., digital components, to a set of users. The details can include a set of distribution parameters, such as distribution parameters and filtering requirements, that specify the type of content to be included in the campaign, the particular types of users to which the campaign is directed (e.g., user attributes of such users), and/or the context in which the digital components of the campaign should be presented. In some implementations, the campaign request 118 describes or includes certain specialized content, e.g., digital components, to be included as part of the digital campaign.

A digital campaign can be a collection of digital component groups (e.g., digital components, keywords, and eligibility values (e.g., bids)) that share a resource constraint (e.g., budget), have common or distinct location criteria that defines the locations, e.g., geographic locations, in which the digital components are eligible for presentation, or have common or distinct themes. The digital campaign can be used to render organized content that indicates categories of products or services offered by a particular entity, such as a company or merchant. A digital component group can contain one or more digital components which include a common set of distribution parameters, e.g., common keywords, eligibility values, resource constraint, and/or location criteria.

In general, the distribution parameters can contribute to, e.g., trigger, the transmission of a digital component by requiring that a component request 122 include at least one criterion that matches, e.g., either exactly or with some pre-specified level of similarity, one of the distribution parameters of the digital component.

In some implementations, the distribution parameters for a particular digital component or campaign can include distribution keywords that must be matched, e.g., by electronic documents, document keywords, or terms specified in the component request 122, for the digital component to be eligible for presentation. Additionally, or alternatively, the distribution parameters can include embeddings that can use various different dimensions of data, such as website details and/or consumption details, e.g., page viewport, user scrolling speed, or other information about the consumption of data. The distribution parameters can also require that the component request 122 include information specifying a particular geographic region, e.g., country or state, and/or information specifying that the component request 112 originated at a particular type of client device, e.g., mobile device or tablet device, in order for the digital component to be eligible for presentation. The distribution parameters can also specify an eligibility value, e.g., ranking score, or some other specified value, that is used for evaluating the eligibility of the digital component for distribution/transmission, e.g., among other available digital components.

The content platform 130 generates a reporting output 103 (described below) that can be received at the interface 116. The reporting output 103 can include data describing details about future execution of a digital campaign. For example, the reporting output 103 can include information about prospective performance of the digital campaign. The prospective performance can indicate a quantity of users (e.g., a quantity of unique users) to which the digital campaign will be directed (e.g., for which digital component(s) of the campaign will be sent) during execution of the campaign using one or more systems of content platform 130 and/or a quantity of futurized queries in response to which the digital campaign will be directed.

The content platform 130 includes a serving system 140 and a forecasting system 150. The serving system 140 generally includes data for digital campaigns 146, and prior component requests/queries 148 that relate to other digital campaigns which may have been previously executed by serving system 140. The historical logs 144 correspond to prior requests/queries 148 and can be provided as an output of the serving system 140. The serving system 140 can store, or have access to, data describing requirements, e.g., distribution parameters or filtering requirements, of existing digital campaigns 146. As described in more detail below, the data describing requirements can be stored or accessed as data structures of the content platform 130. The serving system 140 is configured to serve content of one or more digital campaigns 146, which can include a digital campaign indicated via a new campaign request 118. For example, the serving system 140 processes information related to a component request (e.g., user information and/or contextual information) against campaign requirements ("campaign data structures") that correspond to a given digital campaign.

The forecasting system 150 generally includes forecasting code 155 and a memory 160 that stores sets of futurized queries 165 obtained from an example data processing pipeline. The data processing pipeline generates the sets of futurized queries using data obtained from historical logs 144 that is provided as an output of the serving system 140. The techniques described in this document can be used to implement an improved impression forecasting system 150 that is configured to generate forecasts or forecast outputs used to determine prospective performance of a digital campaign. Each futurized query can be a component request 122 that is predicted to be received in the future.

The forecasting system 150 is configured to load a futurized set of logged user queries (and/or requests) into memory 160. Each query or user query in a futurized set of logged user queries is loaded as a data structure in memory 160. When the content platform 130 receives a request 118 to schedule (or execute) a new digital campaign, the forecasting system 150 is configured to obtain all eligible queries for this new campaign using one or more sets of futurized queries 165. For example, the forecasting system 150 can obtain the eligible queries based on a measure of similarity between the request and the sets of futurized queries 165. The measure of similarity is determined by processing data in the request 118 against at least information in the futurized queries 165. In some examples, the request 118 is a forecast-request that seeks to determine performance of a digital campaign that is scheduled for execution at some future date. The forecasting system 150 determines the measure of similarity using an instruction set of the forecasting code 155 that is derived from the serving code 142.

The forecasting system 150 includes queue system 170 for managing matching data for campaigns and enables quick retrieval of the most up to date matching data for each campaign when the forecasting system 150 is forecasting the performance of campaigns. The queue system 170 is described in more detail below.

Server 102 uses the content platform 130 to generate an example reporting output 103. The reporting output 103 can be a forecast output that includes data describing future execution of a digital campaign. The forecast output 103 can indicate an amount of reach and a particular eligibility, e.g., bid or price, at which a particular digital campaign will serve. For example, the forecast output 103 can indicate that a particular campaign will achieve 1000 impressions, for a particular user demographic, within two days of executing the campaign. Each impression is a presentation of a digital component of the campaign to a user.

The reach for the digital campaign provides an indication of the number of users in a digital audience that actually received or interacted with content of the campaign. In some instances, the digital campaign seeks to provide directed content to a group of users in a digital audience that have a certain set of user attributes, e.g., demographic characteristics, such as age and gender. In other instances, an administrator of multiple digital campaigns may want to know the respective reach and demographic breakdowns of the number of users that received content for each of the multiple campaigns.

The content platform 130 can execute computing processes to suggest or predict adjusted eligibility values based on data included in output forecasts generated by forecasting system 150. In some implementations, the predicted adjusted eligibility values enable content providers to more efficiently expend pecuniary resources to trigger transmission of digital components, e.g., to increase their probability of achieving a given outcome or monetary gain.

The eligibility value can be a pecuniary amount, such as a bid amount, an entity (e.g., a content or digital component provider) will expend to transmit digital components of an ad campaign to achieve a desired conversion outcome. The conversion outcome may result in earning a certain target score or realizing some commercial/monetary gain. In some implementations, the conversion outcome is achieved when a user converts or purchases an item or preforms another specified action following interaction with digital components presented at client device 104.

Figure 2:
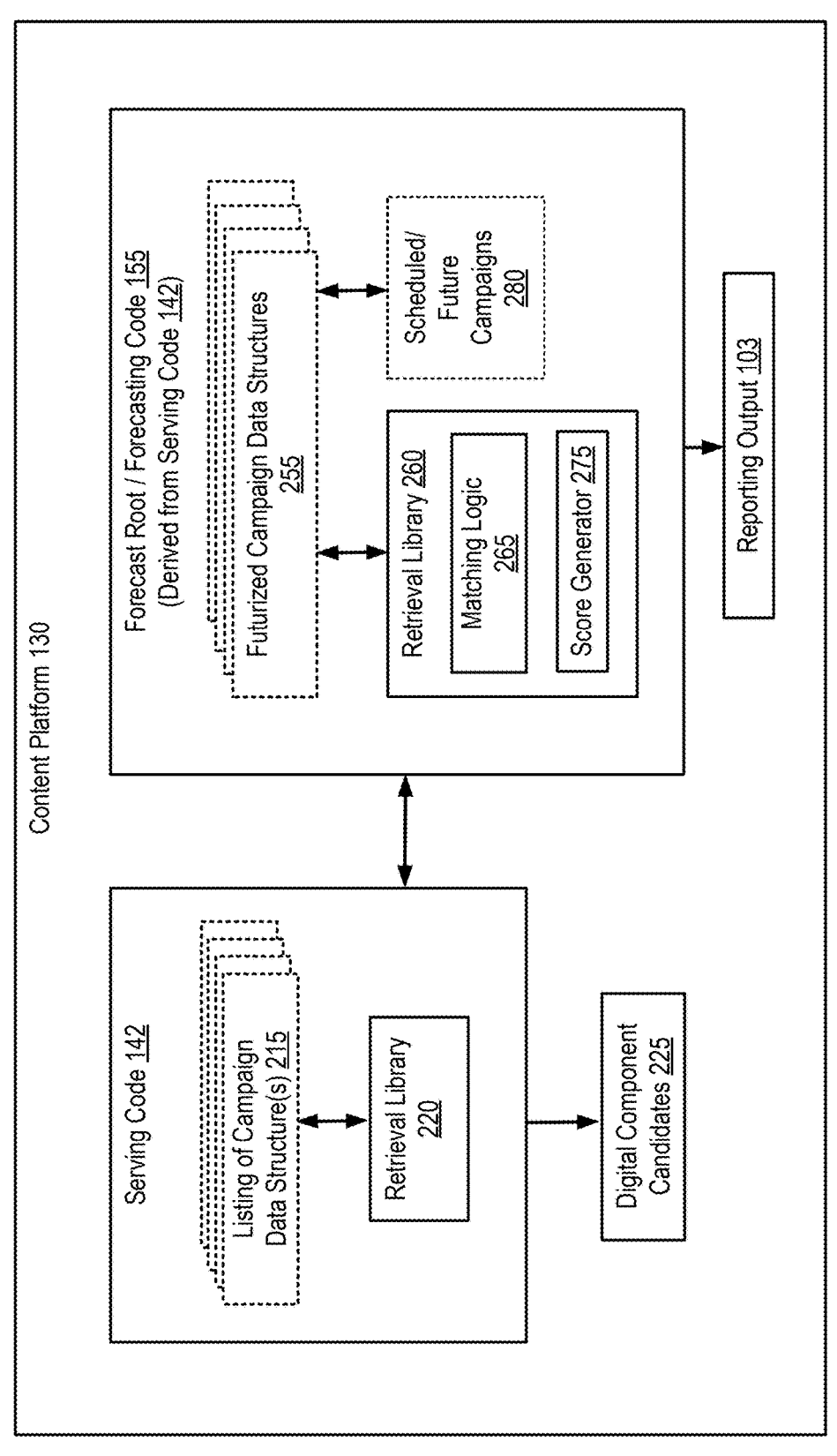
FIG. 2 shows functional blocks of example serving logic and example forecasting logic of a content platform of the computing system of FIG. 1.

FIG. 2 shows functional blocks 200 of example serving logic and example forecasting logic of the content platform 130. The functional blocks 200 indicate that the serving code 142 includes a retrieval library 220 that accesses a listing of campaign data structures 215 and performs operations to generate sets of digital component candidates 225.

For example, the retrieval library 220 of the serving code 142 is configured to include a set of pre-defined reversible data structures for storing requirements in a request to execute a digital campaign. The data structures can also include information about content requests 122, which can also be referred to as user queries, for which specialized content, e.g., digital components, of the campaign can be served as a reply 124. The retrieval library 220 interacts with the listing of campaign data structures 215 to generate a set of digital component candidates 225. The retrieval library 220 can perform filtering and targeting on sets of requests 122 (e.g., queries) using filtering and requirements of a digital campaign (e.g., distribution parameters), where the requirements are included in a request 118 to execute the digital campaign.

The functional blocks 200 also indicate that forecasting code 155 includes a listing of futurized campaign data structures 255 and a retrieval library 260 that interacts with the futurized campaign data structures 255 to generate a forecast/reporting output 103. The futurized campaign data structures 255 also interacts with sets of scheduled or future digital campaigns 280. The reporting output 103 can include information for determining a prospective performance of a digital campaign of request 118, such as information indicating a quantity of users to which the digital campaign will be directed during actual, rather than forecasted, execution of the digital campaign by the serving system 140. The retrieval library 260 includes an instruction set that is derived from the serving code 142.

For example, using the sets of pre-defined reversible data structures included in the serving code 142, the forecasting system 150 derives instruction sets for performing forecasting operations in the same, or substantially the same, way that the serving system 140 performs its serving operations. The derived instruction set of the retrieval library 260 permits the forecasting system 150 to simulate, replicate, or otherwise emulate certain computing operations that are executed by the retrieval library 220 of the serving code 142. For example, the computing operations can be operations that are executed at the serving system 140 to transmit or serve digital components to client device 104 as reply 124 to a request 122 (e.g., query).

The reversible (e.g., adaptable, adjustable, reusable, etc.) data structures of the serving code 142 are uniquely configured as logic structures within the serving code 142 to permit reversal and re-use within the forecasting code 155. For example, the serving code 142 is uniquely organized to enable its overall computing logic to be maintained as a retrieval library. The retrieval library is organized so that a serving representation of a digital campaign and corresponding retrieval logic is easily reversible for implementation at the forecasting system. In one implementation, a reversible data structure corresponds to a particular format or construct used for organizing, managing, or storing data in a manner that enables efficient access and processing of the data. For example, the data structure may be a particular type of data array, data tree, or data file that is adaptable for use by either the serving code 142 or the forecasting code 155.

The serving code 142, including its retrieval library 220 can be organized or structured to have fewer (e.g., substantially fewer) global structures, relative to conventional structuring methods. The serving code 142 also may not use reverse-indexes that are built over existing digital campaigns. Such reverse-indexes can preclude effective re-use and implementation of the serving code 142 by the forecasting system 150. In some implementations, per-campaign data structures are configured to be the same between the serving and forecasting systems 140, 150. This allows campaign data structures 215 to be easily reused by the forecasting code 155 to construct a per forecast-request campaign representation, e.g., for inclusion in the output 103.

The retrieval library 260 includes matching logic 265 and a score generator 275. In general, the matching logic 265 is used to identify futurized queries that match distribution parameters of a campaign. The matching logic 265 can be configured to filter or remove queries from the set of futurized queries based on filtering constraints of the request 118. For example, a futurized query may indicate a user is a female located in the U.K., while a filtering constraint of the request 118 specifies that content be directed to males in Mountain View, California. Similarly, the matching logic 265 can be configured to obtain a particular set of futurized queries based on distribution parameters of the request 118. For example, a set of futurized queries may be generated with user information for males, age 18-25, that reside in large metropolitan cities based on distribution parameters about a particular set of users to which the campaign is directed, where the distribution parameters are specified by the request 118.

In some implementations, the matching logic 265 can include filtering and/or targeting logic, as described in U.S. patent application Ser. No. 16/666,658 filed on Oct. 29, 2019 and titled "Modeling Distribution of Digital Components Over a Network," which is hereby incorporated by reference in its entirety. In some examples, a particular set of requirements can be implemented as either a targeting constraint, a filtering constraint, or a combination of each. For example, demographic information for a digital campaign can be mostly implemented as a targeting constraint using targeting logic, while a subset of the demographic information is implemented as a filtering constraint using filtering logic. One basic example of a filtering constraint can involve filtering logic being used to determine that only digital components with data format X (e.g., a first programming language) are supported by a first user's device, while only digital components with data format Y (e.g., a second programming language) are supported by a second, different user's device.

The score generator 275 is configured to generate scoring data, such as a similarity or match score, for each futurized query that is stored as one or more futurized campaign data structures 255. The scoring data can indicate a measure of similarity between distribution parameters included in a request 118 and user information for each respective futurized query. In some implementations, similarity between the request 118 and a futurized query, e.g., stored as futurized campaign data structures 255, is characterized by a respective match score, e.g., a score of 1.0 or other value, or respective similarity score, e.g., a score ranging from 0.6 to 0.9 or another range of values.

For example, the score generator 275 can generate a similarity score based on matching or substantially similar data items that exist between the request 118 and information for a futurized query. The matching or substantially similar data items can be the result of using matching logic 265 to compare distribution parameters included in the request 118. In some cases, the score generator 275 generates a respective match score to indicate exact matches between data in the request 118 and data included in each futurized query. For example, the matching logic 265 can determine that the request 118 includes age-restricted content that is only appropriate for consumption by users that are at least 21 years. The matching logic 265 can identify or determine whether user information in a futurized query indicates that the user is at least 21 years. In this instance, the score generator 275 generates a match of 1.0 for this discrete data item relating to age-restricted content because user data for the futurized query indicates the user satisfies the filtering constraint.

In other cases, the score generator 275 generates a respective similarity score (e.g., 0.8) to indicate similar, or substantially similar, correlations between data in the request 118 and data included in each futurized query. For example, the matching logic 265 can determine that the request 118 has a eligibility requirement of users that are 20-25 years old and interested in professional basketball. The matching logic 265 can identify or determine that user information for a futurized query indicates that a user is at 25 years old and interested in college basketball, semi-pro basketball, or development basketball leagues that are affiliated with a professional basketball team. In this instance, the score generator 275 can generate an overall similarity score of 0.8 for these discrete data items because user data for the futurized query indicates the user only partially satisfies distribution parameters in the request 118. In some implementations, the score generator 275, as well as matching logic 265 are logical constructs which are shared between the serving code 142 and the forecasting code 155. For example, each of score generator 275 and matching logic 265 can be configured to provide computing functions that are common between serving system 140 and forecasting system 150.

In some implementations, the content platform 130 uses an example log data extraction routine of the forecasting code 155 to obtain and load the futurized queries 165 in memory 160. Based on the matching logic 265, the forecasting system 150 can extract query data from futurized campaign data structures 255 to build or generate a suitable futurized query file. The futurized query file can be generated when outputs of the matching logic 265 are processed or scored by the forecasting system 150 using score generator 275. In some implementations, the futurized query file is generated by an offline computing process that analyzes the historical logs using seasonality logic to predict trends and/or data patterns for projecting data from the historical logs into the future. The futurized query file can be generated by the offline computing process without invoking retrieval logic of the serving code 142, thereby conserving resources of the serving code 142. In some implementations, the futurized query file represents digital component query data which are stored using data structures that allow for fast or rapid Query_data-to-Campaign matching when the forecasting system 150 is used to forecast how a particular campaign will perform when executed using serving system 140. In some cases, the futurized campaign data structures 255 interacts with various scheduled or future digital campaigns 280 to forecast how a particular campaign will perform with reference to the requirements of one or multiple campaigns 280 that have already been scheduled for execution, e.g., using serving system 140.

The forecasting system 150 can use a root-leaf architecture to store the query data in RAM to allow for the fast query data to campaign matching. In some cases, futurized queries that correspond to this query data can be stored within multiple respective data shards in memory 160. Forecasting system 150 can populate a number of allocated impressions for a given request campaign based on computing outputs of matching logic 265 and score generator 275.

Figure 3:
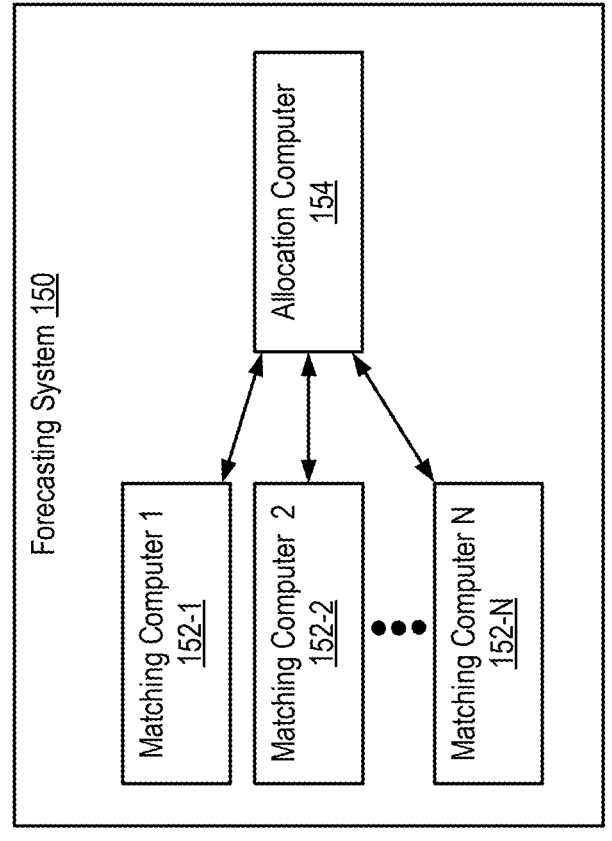
FIG. 3 shows an example forecasting system for forecasting performance of a digital campaign.

FIG. 3 shows an example forecasting system 150 for forecasting performance of a digital campaign. In this example, the forecasting system 150 includes a number "N" of matching computers 152-1 to 152-N that are configured to identify futurized queries that match campaigns and an allocation computer 154 that is configured to allocate futurized queries to campaigns based on matching data output by the matching computers 152-1 to 152-N. This decouples the matching process from the allocation process such that the two processes can be scaled independently to handle any number of requests 118 received from third-party interfaces 116 of third-party content providers, e.g., digital component providers.

For example, the number of matching computers 152-1 to 152-N can be increased to handle larger numbers of requests such that more computers are being used to match the campaigns of the requests to the futurized queries. As the allocation process is typically a global operation performed across all campaigns, or at least some group or multiple campaigns, the allocation computer 154 can be scaled by adding additional processors, replacing processors with more powerful processors, adding memory, using higher bandwidth memory, etc.

To forecast the performance of a campaign, the forecasting system 150 can match each of multiple campaigns with futurized queries using the matching computers 152-1 to 152-N and allocate futurized queries to the matching campaigns using the allocation computer 154. Typically, each futurized query is allocated to one campaign to which the futurized query matches. For example, a futurized query can be allocated to the campaign to which it most closely matches based on the match or similarity score. Each matching computer 152-1 to 152-N can include the retrieval library 260 that includes matching logic 265 and score generator 275.

When a request 118 is received, the forecasting system 150 can split the multiple campaigns between the matching computers 152-1 to 152-N, e.g., by generating campaigns shards that each include the campaign data, e.g., distribution parameters, for one or more campaigns. Each matching computer 152-1 to 152-N can identify, for each campaign, zero or more futurized queries that match the campaign using the matching logic 265 and the score generator 275 and output matching data that indicates the matching futurized queries for each campaign to the allocation computer 154. As described in more detail below, the matching data can be stored in a file system of the queue system 170 so that the allocation computer 154 can quickly identify the relevant matching data to use when forecasting the performance of a campaign.

Figure 4:
FIG. 4 shows components of an example queue system.

FIG. 4 shows components of an example queue system 170. The queue system 170 includes a file system 405 and a queue 420. The file system 405 is configured to store matching data for each campaign for which a request 118 is received. The matching data for a campaign can include, for example, data identifying each futurized query that matches the campaign, an identifier, e.g., name or other alphanumeric identifier, for the campaign, a content provider from which the campaign data is received, and/or other data related to the campaign.

The file system 405 can store the matching data in files 410 of the file system 405. In this example, the file system 405 includes a file 410-1 that includes matching data 412-1 for campaign 1 and matching data 412-2 for campaign 2. Thus, each file 410 can include matching data for multiple campaigns. In some implementations, each file 410 can include matching data for a single campaign.

The file system 405 can store the matching data for campaigns in files as the matching data is received from matching computers 152. For example, the files 410 can have a defined data size and the file system 405 can store matching data in each file 410 until the file reaches the defined data size.

The file system 405 can store multiple instances of matching data for a single campaign. For example, a content provider may adjust the distribution parameters for a campaign over time to have the digital components of the campaign sent to different users, users in different locations, or to adjust the pace at which the digital components are sent to users. The file system 405 can store the matching data generated for each request 118 received from the content provider, e.g., in multiple files depending on when the matching data is generated.

The queue 420 stores queue entries that include pointers to the matching data for the campaigns. In this example, entry A stores a pointer to matching data 412-3 for campaign 3 in file 410-2, entry B stores a pointer to matching data 412-1 for campaign 1 in file 410-1, entry C stores a pointer to matching data 412-2 for campaign 2 in file 410-1, and entry D stores a pointer to matching data 412-4 for campaign 1 in file 2.

Typically, when forecasting the performance of campaigns using the matching data stored in the file system 405, an allocation computer 154 would iterate through the queue entries of the queue 420 in order and obtain the matching data for each campaign in that order. For campaigns having updated matching data stored in the file system 405, e.g., such as campaign 1, the allocation computer 154 would obtain each instance of matching data for the campaign although the previous matching data is no longer applicable to the forecast since the campaign data that resulted in that matching data has been replaced with the newer matching data.

To avoid processing older matching data for campaigns, the queue system 170 can maintain a data structure, e.g., a table of metadata, that indicates the location of most up to date matching data for each campaign. In this example, the data structure can include, for campaign 1, metadata that indicates that the up to date matching data for campaign 1 is stored at a particular location, e.g., a particular memory offset, within file 410-2 rather than the older data in file 410-1. For example, the metadata for a campaign can include the file 410 in which the matching data is stored, the offset within that file 410 at which the matching data is stored, whether the campaign is new or an existing campaign (which can be used to prioritize the processing of matching data as described below), and the identifier for the campaign.

When processing the matching data for the campaigns to allocate futurized queries to campaigns, the allocation computer 154 can use the table to identify the up to date matching data for each campaign and skip the older matching data for each campaign. In this way, the allocation computer 154 can process the matching data more quickly without wasting time and computing resources processing the older matching data that is no longer relevant.

The queue system 170 can be implemented using two different systems, e.g., one for the file system 405 and one for the queue 420. For example, the file system 170 can be implemented using a high throughput system, e.g., a high throughput distributed or cloud-based storage system such as the Colossus storage system provided by Google™. However, some distributed file systems may not support random access to skip old records, e.g., old matching data for a campaign. The queue can be implemented using a Spanner database provided by Google™, which has rich APIs to support random access and persistence. However, such a queue may not support a large enough number of persistent pieces of matching data. Using the two together as described herein allows for the desired persistence while also allowing for dynamic access that enables the consumer, e.g., the allocation computer 454, to skip old data, e.g., old matching data for a campaign.

The queue system 170 can include one or more queue instances. Each queue instance can be uniquely identified by a file system directory and a queue database conforming to a specified schema. A queue instance is a collection of queues. Each queue has a name and can be created by a producer, e.g., a matching computer 152, when the producer commits the first entry into the queue.

Each queue entry can be in the form of a message block. The message block is the atomic commit and can include a collection messages. Each message can have some matching data such as a measure of similarity, e.g., a match or similarity score. The queue system can include a message block handle for each message block. A message block handle is a self-contained piece of information that allows the message block to be read. There is also a timestamp that indicates when a message block is committed to a queue.

A producer, e.g., a matching computer 152, can be configured to create a message block and atomically commit the message block to the queue. For example, a message block can be added for each instance of matching data. Once committed, the producer gets access to a message block handle that can be used to read data if committed in a self-contained manner.

A consumer, e.g., an allocation computer 154, has the ability to subscribe to a queue from a timestamp T which means the consumer will receive ordered notifications for all message blocks with timestamp>=T and get notified with its message block handle to process them separately. In this way, if the allocation computer 154 crashes, it can restart at the correct timestamp and process the appropriate matching data for forecasting performance of campaigns.

When a producer wants to write a message block over a queue, internally the queue system 170 maintains a free list of files and takes a single file from that list. The queue system 170 buffers the messages written to a message block in-memory and writes it as a file backed by an in-memory file. The file can be of a file format for storing a list of records in order, backed by an in-memory file. Based on in-memory size threshold configured there may be a swap operation triggered to write the data to the file. Once all the messages are written, then the data can be flushed into file as an append to the end of the file. The offset and length corresponding to the section on which data is written can be recorded into a protocol buffer or the appropriate mechanism for serializing structured data. This metadata, which can be referred to as MessageBlockHandle), can then be written into a Spanner table or other appropriate data structure.

When a producer writes metadata about the block, the producer writes it to a table which conceptually can have the form of a key value pair: <Key: QueueName, CommitTimestamp, Value: MessageBlockHandle>. Here, QueueName refers to a name or other identifier for the queue, CommitTimeStamp refers to a time at which the metadata is written to the table, and MessageBlockHandle is the metadata. Each write of this to Spanner can assign a unique commit timestamp in the key.

A consumer thread can subscribe to a particular QueueName from time "T". The consumer thread can do this by polling for the QueueName by a Strong Read (e.g., every 5 s or so) to read from time "T" and if it sees any row>=T, it sends notification to the client. In Spanner, a strong read is a read at a current timestamp that is guaranteed to have access to all data that has been committed up until the start of the read.

In some implementations, the forecasting system 150 can prioritize the processing of matching data for new campaigns relative to updates to existing campaigns as the new campaigns typically have a larger impact on the bipartite graph that maps futurized queries to the campaigns to which they have been allocated. For example, allocation data for existing campaigns can be persisted in the form of a bipartite graph. A new campaign may not affect many, if any futurized queries that are already mapped to a campaign in the graph. For example, the system can ignore these mapped futurized queries when processing a request for a new campaign. The system can also ignore mapped futurized queries for all campaigns except for those of an updated campaign when processing a request for an updated campaign. In these examples, the updates to the graph are largely mapping unallocated futurized queries to the new or updated campaign.

The priority processing can be achieved using two queues, one for new campaigns and one for existing campaigns. For example, the queue system 170 can include a queue for new campaigns and a queue for existing campaigns. The forecasting system 150 can prioritize the matching of new campaigns in the matching computers 152 over the matching of existing campaigns in the matching computers 152. Additionally, the consumers can be configured to process new queue entries in the new campaign queue prior to processing new queue entries in the existing campaign queue.

The prioritization can also be accomplished using a single queue. As described above, the metadata for matching data of a campaign in the data structure can include data indicating whether the matching data is for a new campaign or existing campaign. The allocation computer 154 can use this data to prioritize the matching data that is processed, e.g., to process matching data for new campaigns over matching data for existing campaigns.

Figure 5:
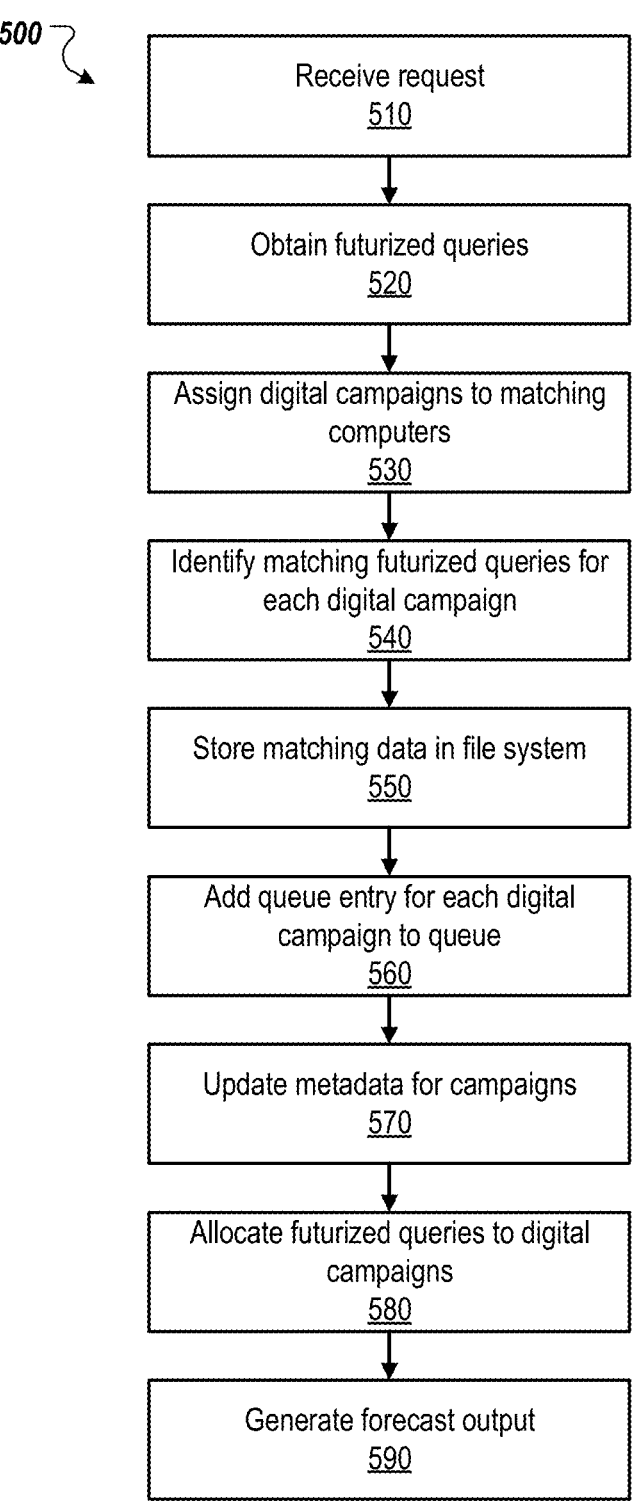
FIG. 5 is a flow diagram of an example process for forecasting performance of a digital campaign.

FIG. 5 is a flow diagram of an example process 500 for forecasting performance of a digital campaign. Operations of the process 500 can be performed, for example, by the forecasting system 150 described herein. The operations of the process 500 can also be implemented as instructions stored on a computer readable medium, which can be non-transitory. Execution of the instructions, by one or more data processing apparatus, causes the one or more data processing apparatus to perform operations of the process 500.

A request is received (510). For example, the forecasting system 150 can receive, from a content provider, a request 118 for a campaign. The request 118 can include distribution parameters for the campaign. The request 118 can be to schedule the campaign and/or to forecast the number of users that the campaign will reach.

Futurized queries are obtained (520). Based on the received request, the forecasting system 150 accesses or obtains data for requests 148 from historical serving logs 144 of the serving system 140. The obtained data can correspond to multiple futurized queries 165 or multiple sets of futurized queries 165. For each futurized query, the forecasting system 150 loads the futurized query as a data structure in the memory 160 of the forecasting system (320). For example, the forecasting system 150 can load the futurized queries 165 in memory 160 before (e.g., as a precompute step) any forecast-requests 118 are received at the forecasting system 150. In this manner, the forecasting system 150 can facilitate rapid processing of forecast-requests 118 by pre-loading sets of futurized queries 165 in memory 160. When the forecasting system 150 receives a forecast-request 118, the system 150 obtains or accesses data for the futurized queries 165 and proceeds to iterate the request over data elements of the futurized queries 165 to determine certain matches and similarities between the request 118 and the futurized queries 165.

Digital campaigns are assigned to matching computers (530). For example, the forecasting system 150 can use multiple matching computers 152 to identify futurized queries that match the distribution parameters of campaigns. The forecasting system 150 can assign each campaign to a matching computer 152 so that the matching computer 152 can identify futurized queries that match the campaign.

Matching futurized queries are identified for each campaign (540). Each matching computer 152 can identify matching futurized queries for its assigned campaigns. As described above, a matching computer 152 can identify futurized queries that match a campaign based on measures of similarity (e.g., matching or similarity scores) for the futurized queries and the distribution parameters for a campaign.

The matching data for each campaign can be stored in a file system (550). For example, each matching computer 152 can store, for a campaign, matching data that indicates one or more futurized queries that match the campaign in the file system 405. The matching computer 152 can also add a queue entry for the matching data to the queue 420. The queue entry points to the location in the file system 405 at which the matching data is stored.

In some implementations, the matching data is not stored in the file system for a campaign when the request is for forecasting the performance of the campaign but is stored in the file system when the request is for initiating or updating a campaign in which the serving system 140 distributes digital components for the campaign. If a campaign is initiated, e.g., based on the request or by the content provider after the forecasted performance is provided to the content provider, the matching data is persisted in the file system. Thus, in some implementations, the file system can store matching data for campaigns that are active and/or have been active at some point in time, but not for campaigns for which the performance is being evaluated without the campaign yet being active.

Metadata for each campaign is updated in a data structure, e.g., table or database, of the queue system (570). As described above, the metadata can include an identifier for the campaign, the location in the file system of the matching data, and/or whether the campaign is new or existing.

The futurized queries are allocated to the campaigns (580). As described above, one or more matching futurized queries can be allocated to each campaign, e.g., based on the measures of similarity between the matching futurized queries and the distribution parameters of the campaigns. The matching futurized queries can be mapped to campaigns in the form of a bipartite graph or data representing a bipartite graph.

A forecast output is generated based on the allocation (590). For example, the forecast output can be generated based on the number of futurized queries allocated to each campaign. This number of futurized queries can be used to determine the number of users that will be reached by the campaign. The forecast output can be provided to the digital component provider of the campaign. The digital component provider can review the forecast output and, if appropriate, make changes to the distribution parameters or other aspects of the campaign to increase or decrease the number of users that is forecast to be reached by the campaign.

Figure 6:
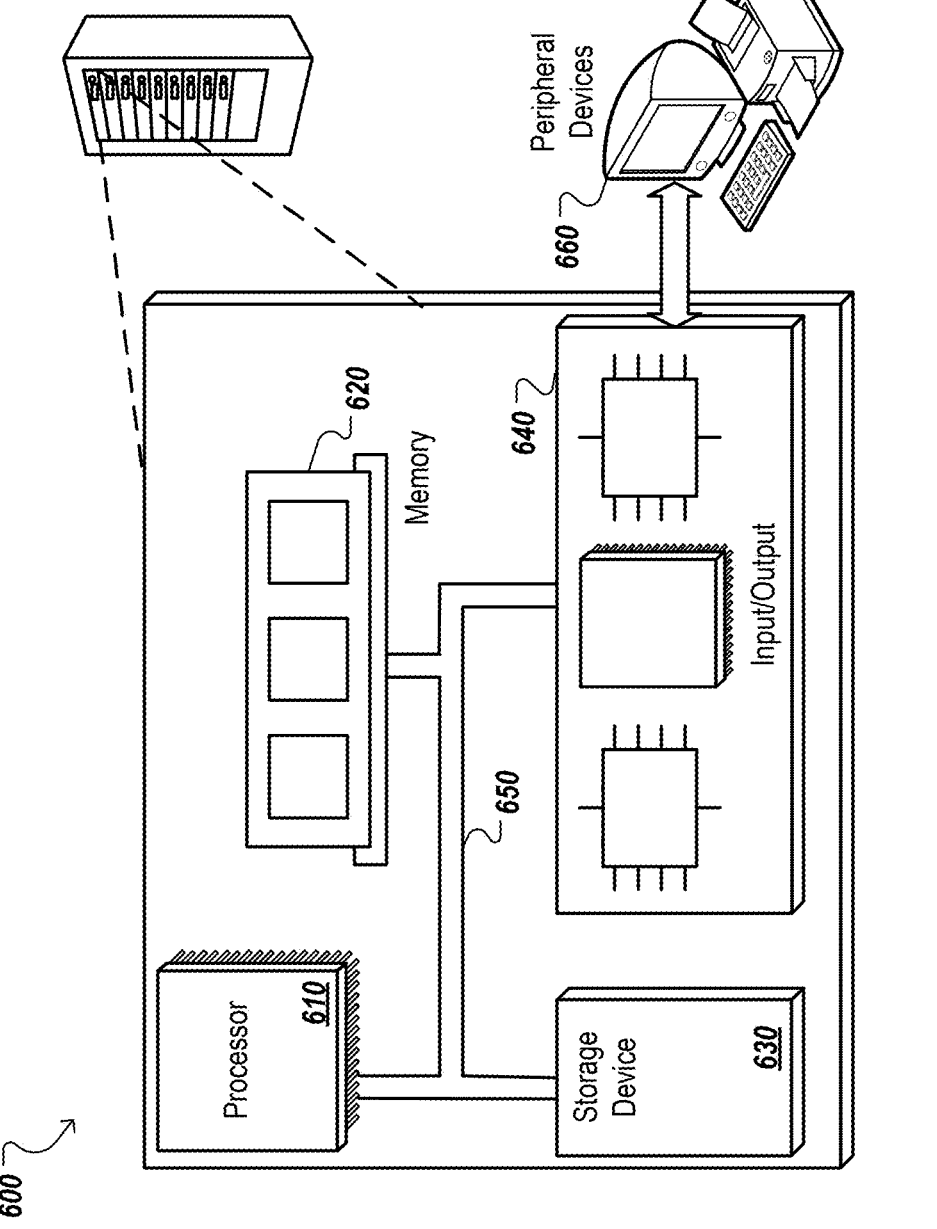
FIG. 6 is a block diagram of an example computer system.

FIG. 6 is a block diagram of an example computer system 600 that can be used to perform operations described above. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can include, for example, a hard disk device, an optical disk device, a storage device that is shared over a network by multiple computing devices (e.g., a cloud storage device), or some other large capacity storage device.

The input/output device 640 provides input/output operations for the system 600. In one implementation, the input/output device 640 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other devices, e.g., keyboard, printer, display, and other peripheral devices 660. Other implementations, however, can also be used, such as mobile computing devices, mobile communication devices, set-top box television client devices, etc.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document (which for brevity will simply be referred to as a document) does not necessarily correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

This document refers to a service apparatus. As used herein, a service apparatus is one or more data processing apparatus that perform operations to facilitate the distribution of content over a network. The service apparatus is depicted as a single block in block diagrams. However, while the service apparatus could be a single device or single set of devices, this disclosure contemplates that the service apparatus could also be a group of devices, or even multiple different systems that communicate in order to provide various content to client devices. For example, the service apparatus could encompass one or more of a search system, a video streaming service, an audio streaming service, an email service, a navigation service, an advertising service, a gaming service, or any other service.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   receiving a request comprising distribution parameters for a given digital campaign;
   obtaining, based on the received request, futurized queries from historical serving logs of a serving system that is configured to provide existing digital components using serving code;
   for each of multiple digital campaigns including the given digital campaign:
       assigning the digital campaign to one of multiple matching computers;
       identifying, by the assigned matching computer, one or more of the futurized queries that match the digital campaign;
       storing matching data indicating the one or more futurized queries in a file of a file system;
       adding a queue entry for the matching data to a queue, wherein the queue entry points to a location in the file system at which the matching data is stored; and
       updating metadata for the digital campaign in a data structure, wherein the metadata comprises an identifier for the digital campaign and memory location information indicating a location in the file system at which most recent matching data for the digital campaign is stored;
   generating an allocation of futurized queries to digital campaigns by processing the matching data for each digital campaign to allocate at least one futurized query to each digital campaign, wherein the processing comprises using the queue entry and the metadata for each digital campaign to identify the location in the file system at which most recent matching data for the digital campaign is stored and obtaining the most recent matching data for the digital campaign from the identified location, and wherein each futurized query is allocated to a single digital campaign; and
   generating, for the given digital campaign and based on the allocation of the futurized queries to the digital campaigns, a forecast output as a response to the request, wherein the forecast output includes data describing future provision of one or more digital components of the given digital campaign.

2. The computer-implemented method of claim 1, wherein a single allocation computer generates the allocation of the futurized queries to the digital campaigns.

3. The computer-implemented method of claim 1, wherein identifying, by the assigned matching computer, one or more of the futurized queries to the digital campaign comprises:

determining, for each futurized query, a measure of similarity between the distribution parameters and the futurized query; and selecting the one or more futurized queries for the digital campaign based on each measure of similarity.

4. The computer-implemented method of claim 1, wherein the forecast output indicates a quantity of users to which the one or more digital components will be directed by the serving system.

5. The computer-implemented method of claim 1, wherein the file system comprises a plurality of files and at least some of the files store matching data for multiple campaigns.

6. The computer-implemented method of claim 1, wherein each queue entry points to a location in the file system at which the matching data corresponding to the queue entry is stored.

7. The computer-implemented method of claim 1, wherein the metadata for each digital campaign comprises data indicating whether the digital campaign is a new campaign or an existing campaign.

8. The computer-implemented method of claim 1, wherein generating the allocation of futurized queries to digital campaigns by processing the matching data for each digital campaign to allocate at least one futurized query to each digital campaign comprises processing the matching data for digital campaigns for which the metadata indicates that the digital campaigns are new prior to processing the matching data for digital campaigns for which the metadata indicates that the digital campaigns are existing.

9. A system comprising:

one or more computers; and one or more storage devices storing instructions that when executed by the one or more computers, cause the one or more computers to perform operations comprising:

receiving a request comprising distribution parameters for a given digital campaign;

obtaining, based on the received request, futurized queries from historical serving logs of a serving system that is configured to provide existing digital components using serving code;

for each of multiple digital campaigns including the given digital campaign:

assigning the digital campaign to one of multiple matching computers;

identifying, by the assigned matching computer, one or more of the futurized queries that match the digital campaign;

storing matching data indicating the one or more futurized queries in a file of a file system;

adding a queue entry for the matching data to a queue, wherein the queue entry points to a location in the file system at which the matching data is stored; and updating metadata for the digital campaign in a data structure, wherein the metadata comprises an identifier for the digital campaign and memory location information indicating a location in the file system at which most recent matching data for the digital campaign is stored;

generating an allocation of futurized queries to digital campaigns by processing the matching data for each digital campaign to allocate at least one futurized query to each digital campaign, wherein the processing comprises using the queue entry and the metadata for each digital campaign to identify the location in the file system at which most recent matching data for the digital campaign is stored and obtaining the most recent matching data for the digital campaign from the identified location, and wherein each futurized query is allocated to a single digital campaign; and generating, for the given digital campaign and based on the allocation of the futurized queries to the digital campaigns, a forecast output as a response to the request, wherein the forecast output includes data describing future provision of one or more digital components of the given digital campaign.

10. The system of claim 9, wherein a single allocation computer generates the allocation of the futurized queries to the digital campaigns.

11. The system of claim 9, wherein identifying, by the assigned matching computer, one or more of the futurized queries to the digital campaign comprises:

determining, for each futurized query, a measure of similarity between the distribution parameters and the futurized query; and selecting the one or more futurized queries for the digital campaign based on each measure of similarity.

12. The system of claim 9, wherein the forecast output indicates a quantity of users to which the one or more digital components will be directed by the serving system.

13. The system of claim 9, wherein the file system comprises a plurality of files and at least some of the files store matching data for multiple campaigns.

14. The system of claim 9, wherein each queue entry points to a location in the file system at which the matching data corresponding to the queue entry is stored.

15. The system of claim 9, wherein the metadata for each digital campaign comprises data indicating whether the digital campaign is a new campaign or an existing campaign.

16. The system of claim 9, wherein generating the allocation of futurized queries to digital campaigns by processing the matching data for each digital campaign to allocate at least one futurized query to each digital campaign comprises processing the matching data for digital campaigns for which the metadata indicates that the digital campaigns are new prior to processing the matching data for digital campaigns for which the metadata indicates that the digital campaigns are existing.

17. One or more non-transitory computer-readable storage media storing instructions that, when executed by one or more computers, cause the one or more computers to perform operations comprising:

receiving a request comprising distribution parameters for a given digital campaign;

obtaining, based on the received request, futurized queries from historical serving logs of a serving system that is configured to provide existing digital components using serving code;

for each of multiple digital campaigns including the given digital campaign:

assigning the digital campaign to one of multiple matching computers;

identifying, by the assigned matching computer, one or more of the futurized queries that match the digital campaign;

storing matching data indicating the one or more futurized queries in a file of a file system;

adding a queue entry for the matching data to a queue, wherein the queue entry points to a location in the file system at which the matching data is stored; and updating metadata for the digital campaign in a data structure, wherein the metadata comprises an identifier for the digital campaign and memory location information indicating a location in the file system at which most recent matching data for the digital campaign is stored;

generating an allocation of futurized queries to digital campaigns by processing the matching data for each digital campaign to allocate at least one futurized query to each digital campaign, wherein the processing comprises using the queue entry and the metadata for each digital campaign to identify the location in the file system at which most recent matching data for the digital campaign is stored and obtaining the most recent matching data for the digital campaign from the identified location, and wherein each futurized query is allocated to a single digital campaign; and generating, for the given digital campaign and based on the allocation of the futurized queries to the digital campaigns, a forecast output as a response to the request, wherein the forecast output includes data describing future provision of one or more digital components of the given digital campaign.

18. The one or more non-transitory computer-readable storage media of claim 17, wherein a single allocation computer generates the allocation of the futurized queries to the digital campaigns.

19. The one or more non-transitory computer-readable storage media of claim 17, wherein identifying, by the assigned matching computer, one or more of the futurized queries to the digital campaign comprises:

determining, for each futurized query, a measure of similarity between the distribution parameters and the futurized query; and selecting the one or more futurized queries for the digital campaign based on each measure of similarity.

20. The one or more non-transitory computer-readable storage media of claim 17, wherein the forecast output indicates a quantity of users to which the one or more digital components will be directed by the serving system.

* * * * *